Dec. 4, 1934.  C. SAUZEDDE  1,982,698
COMBINED BRAKE HOUSING AND WHEEL
Filed Nov. 18, 1931   2 Sheets-Sheet 2

INVENTOR
Claude Sauzedde
BY
ATTORNEYS

Patented Dec. 4, 1934

1,982,698

UNITED STATES PATENT OFFICE 1,982,698

COMBINED BRAKE HOUSING AND WHEEL

Claude Sauzedde, Detroit, Mich., assignor to Detroit Hydrostatic Brake Corporation, Detroit, Mich., a corporation of Michigan Application November 18, 1931, Serial No. 575,841

7 Claims. (Cl. 301—6)

My invention is a combined brake housing and wheel for motor vehicles.

An object of the present invention resides in the provision of a combined brake housing and wheel for motor vehicles wherein the housing and wheel are arranged in such manner as to effectively dissipate the heat generated in the housing incident to the application of the braking mechanism confined therein.

Another object of the invention is to provide a wheel construction wherein the cooling portion of the surfaces of the brake housing are unobstructed so that a maximum cooling or air contacting surface is provided.

The invention further contemplates a wheel structure wherein the brake housing constitutes a wheel mount for a demountable wheel having a hub arranged to be detachably secured to the periphery of the housing, the wheel structure being such as to permit the free circulation of air currents over the hub in an axial direction.

With the preceding and other objects and advantages in mind, the invention consists in the novel combination of elements, construction and arrangement of parts and operations to be hereinafter specifically referred to, claimed and illustrated in the accompanying drawings, wherein—

Figure 1:
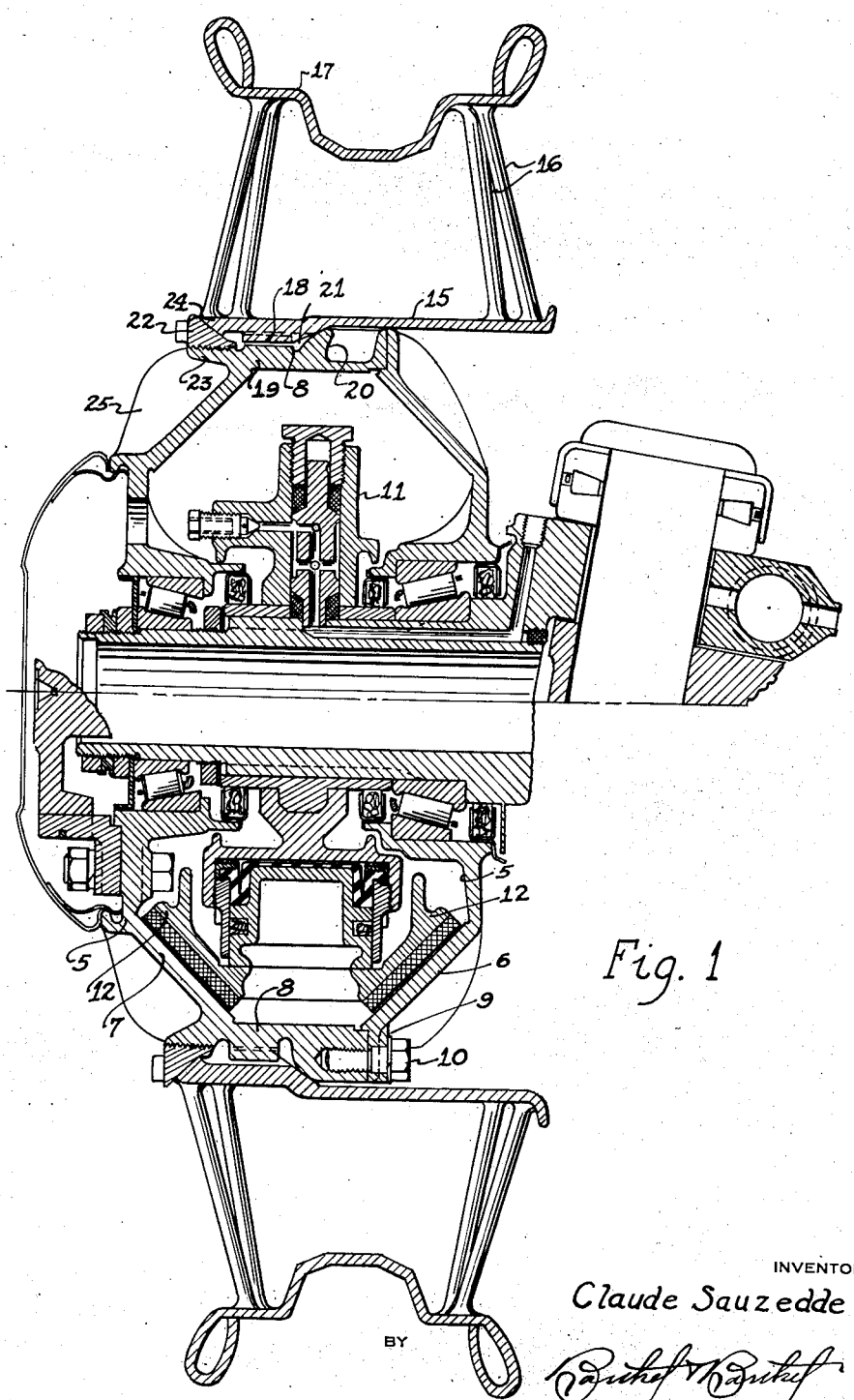
Figure 2:
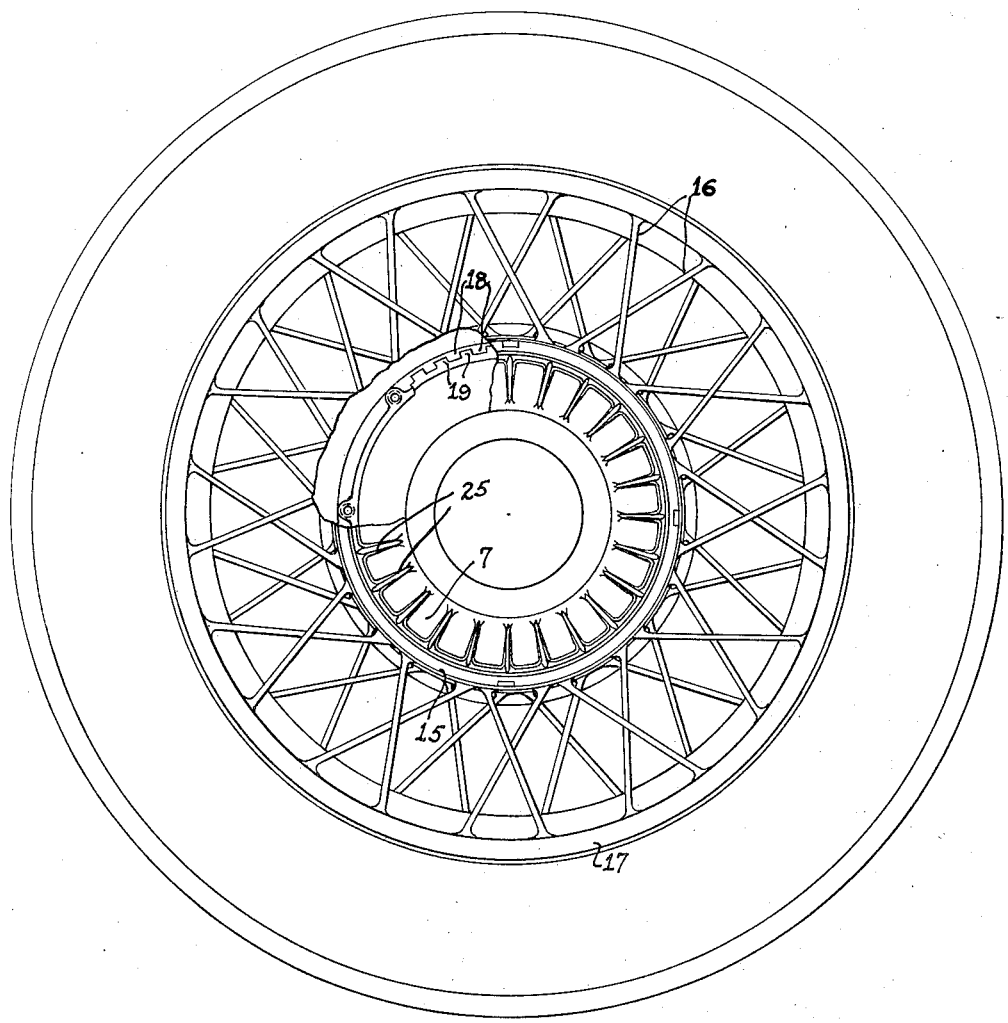

Figure 1 is a composite view of the front and rear wheel assembly and showing the same in vertical section; and Fig. 2 is a side elevation of a vehicle wheel embodying my invention, and having parts broken away.

Referring to the invention in detail, a circular brake housing is provided composed of spaced side walls 5 having their outer ends formed with divergent inwardly extending portions 6 and 7 constituting brake drums. A circular peripheral portion or flange 8 is integrally formed with the outer edge of the angularly disposed wall 6 and extends to and abuts a laterally extending annular flange 9 formed on the outer edge of the wall 6. Bolts 10 extend through the flange 9 and engage the abutting face of the peripheral portion 8 to removably secure the side wall 5 in place.

A fluid operated brake mechanism set forth and claimed in my co-pending application, Serial No. 584,666, filed January 4, 1932, generally indicated at 11 and having radially movable shoes 12 which operate against the brake drums 6 and 7, is contained within and completely enclosed by the brake housing.

A demountable wheel is provided and arranged to be supported on the brake housing. The demountable wheel comprises a hub 15 of a diameter to receive the peripheral portion or annular flange 8, and extending radially therefrom are the spokes 16 which support a tire carrying rim 17. In order to secure the wheel to the brake housing the inner face of the hub 15 is formed with a plurality of spaced inwardly extending lugs 18 adjacent its outer edge which interfit with similar lugs 19 formed on the peripheral portion or annular flange 8.

The wheel is held against axial movement by means of an annular enlargement or bead 20 formed on the peripheral portion intermediate its ends which abuts an inclined shoulder 21 formed on the inner face of the hub 15 rearwardly of the lugs 18. A cone shaped clamping ring 22 is threadedly engaged with an outwardly and laterally extending annular flange 23 forming a continuation of the peripheral portion 8 and clamps against the outer beveled surface 24 on the hub 15.

To aid in the cooling of the brake housing by air currents incident to the rotation of the wheel, a plurality of radially extending cooling fins 25 are formed on the inclined portions 6 and 7 of the side walls. It will be apparent that when the wheel rotates, heat will be dissipated therefrom in an axial direction, and as all of the surfaces of the housing are exposed there will be no obstruction to the air currents. Moreover the air currents can pass between the hub and rim and thus aid in the cooling of the peripheral portion of the housing.

As indicated by the drawings, the invention is designed to meet one of the modern developments of the wheel art, viz: a wheel in which the tire is of a "super-balloon" type, having a relatively large cross-sectional contour. Tires of this type have relatively large cross-sectional overall dimensions, although the overall diameter dimension is not materially increased. As a result, the support for the tire is of relatively small diameter, tending more in the nature of a hub than a wheel. In companion applications, as for example the application above referred to, the tire itself is mounted upon this "hub," the arrangement permitting the substitution of tires. The present invention pertains more particularly to the carrying of the basic idea of a structure of this type having a brake mechanism within the hub, to structures of the demountable wheel type, in which the tire is carried by a wheel formation and the whole is demountable. Since this involves the presence of a wheel section as a part of the inner supporting structure for the tire, and thus decreases the possible diameter of the "hub" portion, it is apparent that a number of problems are presented, since the combined hub and wheel section must be provided within the space normally present within the "hub" dimensions of this type of tire.

In other words, the radial dimensions of the usual hub must now be divided into hub and wheel zones, while the width dimension remains as before. Consequently, the diameter of the hub must be decreased an amount sufficient to permit the presence of the wheel section, and yet permit the use of the efficient braking mechanism and at the same time provide for efficient support of the tire by the wheel section.

The problem with respect to the "hub" portion is met by reducing the radial dimension of the hub and reducing the length of the brake applying means—the latter being operated by hydrostatic pressure as indicated in the companion application referred to. This permits the opposed inclined walls 6 and 7, which provide the braking surfaces of the hub, to be brought inward toward the hub axis without decreasing the braking effect possible, the peripheral section of the hub being reduced in overall diameter a distance sufficient to permit of the insertion of the wheel section and the tire carried thereby.

The demountable section also presents its problems in that the greater width of a tire of this type generally means the need for an expanded base, especially where the wheel is of the wire spoke type, to provide an effective supporting action. Since, as indicated in the drawings, the width of the tire-rim itself is greater than the width of the peripheral section of the hub, the difficulties of an assembly in which the wheel base (15, for instance) is of still greater width is apparent.

The invention solves the assembly problem by an asymmetrical arrangement of the wheel and hub—planes normal to the hub and wheel axis and which extend centrally of the hub and wheel respectively, are displaced relatively to each other, the plane of the wheel being within the hub, but no longer aligned with the similar plane of the hub. This relative assembly is made possible by locating the supporting and driving complemental means—the removable and fixed flanges 22 and 20 and the complemental faces of 15, and the driving lugs therebetween—at one side of such wheel plane, the major portion of the opposite side of the wheel being unsupported by the hub, the latter, however, extending beyond such wheel plane, so that the center of the tread is still within the width of the peripheral section of the hub.

The combined arrangement thus provides a demountable wheel section within the dimensions of this type of tire, and, at the same time provides a complete assembly in which the wheel itself is a braking wheel with the braking mechanism completely housed within the wheel.

While I have illustrated the demountable wheel as of the wire spoke type it will be manifest that the inventor contemplates all types of wheels now in use such as disc, artillery wheels, etc.

What is claimed is:

1. In motor wheel assemblies wherein a wheel formation is demountably secured bodily to the periphery of a hub structure forming a housing for and co-operating with a brake mechanism therein, and in combination, a hub having opposing side walls each having an inwardly-inclined wall adapted to form a braking surface for the brake mechanism, said walls being spaced by a peripheral section carried by one wall and connected to the other wall to complete the periphery of the hub, and a wheel formation carried by said peripheral section, said formation and peripheral section having complementary means for securing the formation in supported and drive relation on said section, the width of the section being materially less than the width of the formation with said complementary means located at one side of a plane normal to the wheel formation axis and extending substantially centrally of the wheel formation width.

2. A combination as in claim 1 characterized in that the complementary means is spaced from the point of juncture of the peripheral section and the opposed side wall.

3. A combination as in claim 1 characterized in that the complementary means is spaced from the point of juncture of the peripheral section and the opposed side wall, said point of juncture being located on the opposite side of such plane and in proximity thereto, whereby a material portion of the latter side of the wheel formation is unsupported by the peripheral section.

4. A combination as in claim 1 characterized in that the complementary means includes a fixed and a removable wheel seat carried by such peripheral section, said fixed seat being intermediate the width of the section, the complementary seats of the wheel formation being located on the same side of such plane.

5. A combination as in claim 1 characterized in that the complementary means includes a fixed and a removable wheel seat carried by the peripheral section, said fixed seat being intermediate the width of the section, the complementary seats of the wheel formation being located on the same side of such plane, said means also including complementary driving structures located intermediate the seats.

6. A combination as in claim 1 characterized in that the inclined walls within the zones of the respective braking surfaces are provided with external heat-dissipating structures integral with the walls, said heat-dissipating structures projecting outwardly and in substantially radial direction transversely of the direction of wheel rotation, whereby the structures will provide air agitation during wheel rotation.

7. A combination as in claim 1 characterized in that the inclined walls within the zones of the respective braking surfaces are provided with cooling fins integral with said inclined walls and extending radially thereof and projecting laterally outward therefrom.

CLAUDE SAUZEDDE.